Jan. 5, 1971 W. J. COLLINS 3,552,214
DEVICE FOR SAMPLING MOLTEN METAL
Original Filed March 18, 1968 2 Sheets-Sheet 1
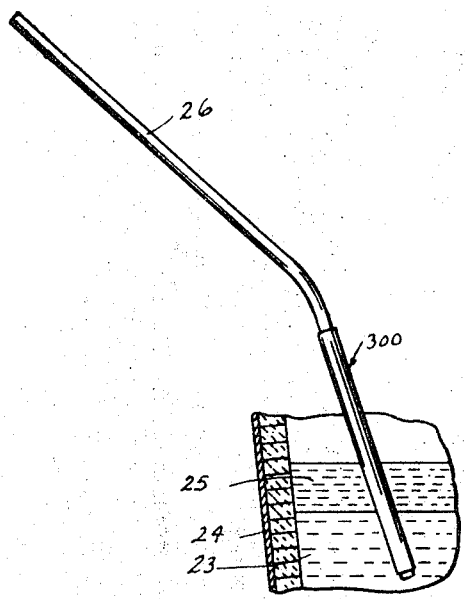
FIG.1
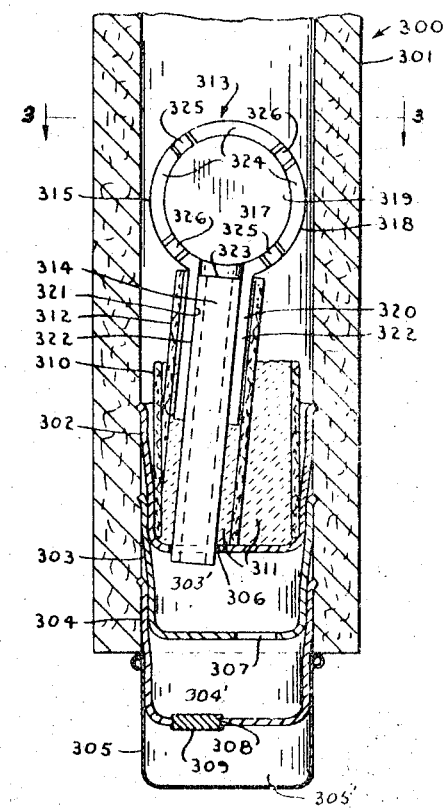
FIG.2
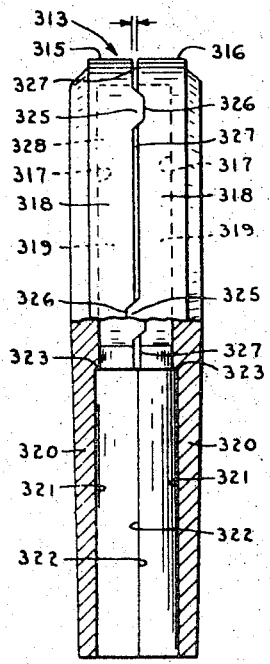
FIG.4
FIG.3
INVENTOR.
WILLIAM J. COLLINS
BY
Charles S. Pinfold
ATTORNEY United States Patent Office 3,552,214
Patented Jan. 5, 1971

3,552,214
DEVICE FOR SAMPLING MOLTEN METAL
William J. Collins, Gary, Ind.
(7005 Madison St., Merrillville, Ind. 46410)
Original application Mar. 18, 1968, Ser. No. 713,640.
Divided and this application Mar. 25, 1969, Ser.
No. 818,177
Int. Cl. G01n 1/12
U.S. Cl. 73—425.4                                    10 Claims

ABSTRACT OF THE DISCLOSURE

A molten metal sampler of the type comprising an elongated tubular housing having a sample receiver mounted in the lower end thereof so that molten metal flows into the receiver and solidifies when the housing is inserted into a molten metal bath. The invention involves a ring shaped support for facilitating removal of the receiver from the housing after the device is removed from the bath.

---

This application is a division of my application Serial No. 713,640 filed Mar. 18, 1968, the latter being a continuation-in-part of applications Ser. Nos. 391,654 filed Aug. 24, 1964, now abandoned; 590,829 filed Oct. 31, 1966, now Pat. No. 3,415,124 and 649,764 filed May 12, 1967, now Pat. No. 3,415,125.

The device may be employed wherever applicable and has proven very efficient and reliable in obtaining samples of molten metal for chemical analysis of all of its elements including the amount of gases, such as oxygen, hydrogen and nitrogen contained therein may be ascertained. The sample may be obtained from any chamber such as an open hearth furnace, a basic oxygen vessel, electric furnace or related metal making facility. The sample obtained may also be tested to determine its physical characteristics.

An important object of the invention is to provide a device which includes a unit or structure for receiving molten metal, a housing, and improved means for connecting the housing and unit in a manner whereby to facilitate destruction or release of the latter from the housing after the device is dipped into a bath of molten metal to obtain a sample thereof.

Another object of the invention is to provide a device in which the housing is preferably of metal and the unit includes means for receiving the sample disposed substantially centrally within the confines of the housing, with an annular space about at least a portion of the receiving means. Otherwise expressed, the internal cross-sectional dimension of the housing is somewhat greater than the cross-sectional dimension or dimensions of the unit whereby to facilitate release of the unit from the housing when the connecting means is broken or separated.

A specific object is to provide a device in which the housing is preferably protected by a non-metallic sheath which also assists in sealing the unit in relation to the housing.

Another specific object of the invention is to provide a unit, including a plurality of metal cups which are preferably held together in a pressed or stacked nested relationship and one of the cups is primarily attached to the housing by the connecting means.

Additional objects reside in providing a device which offers advantages with respect to manufacture and assembly, efficiency, safety, and destruction whereby to obtain access to the recovered sample or specimen.

Other objects and advantages of the invention will become apparent after the description hereinafter set forth is considered in conjunction with the drawings annexed hereto.

Refering to the drawings:

FIG. 1 is a view showing a mode of manipulating a wand connectible to the device for dipping the latter into a bath of molten metal;

FIG. 2 is a vertical section taken through a device;

FIG. 3 is a transverse section taken substantially on line 3—3 of FIG. 2;

FIG. 4 is a vertical section showing a part of the device shown in FIGS. 2 and 3;

Figure 5:
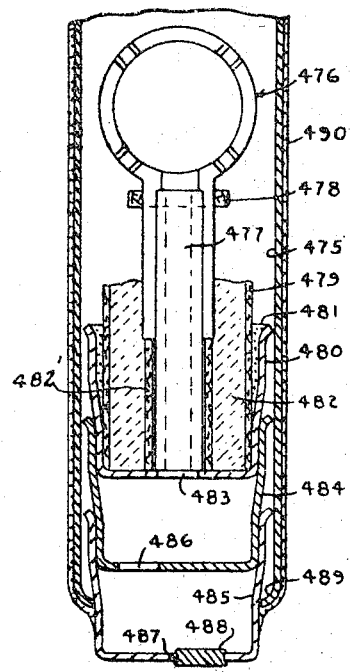
FIG. 5 is a vertical section showing a device embodying the invention.

The structure exemplified in FIGS. 1, 2, 3 and 4 and description hereinafter relative thereto is presented solely for the purpose of perhaps affording a better foundation or support for the disclosures in FIGS. 5, 6, and 7, the latter of which embody the invention or inventions of the subject application.

The device generally designed at 300, for example, includes an outer jacket or tubular housing 301, constructed of some desirable frangible material such as heavy cardboard, and a unit comprising a plurality of cups 302, 303, 304 and 305 which are operatively connected to define chamber 303', 304', and 305'. The three cups 302, 303 and 304 have rims which bite into the housing when the unit is press-fitted into place and the cup or cap 305 has a rim which preferably engages the lower end of the housing. The bottom wall of the uppermost cup 302 is provided with an opening 306, the bottom wall of the cup 303 with an opening 307 and the bottom wall of cup 304 with an opening 308 in which is secured a deoxidizing fusible element 309, such as aluminum.

It will be observed that aperture 307, is offset with respect to a line extending through the axes of the apertures 306 and 308.

The device 300 also preferably includes a relatively short tube 310 which is preferably firmly secured in the innermost cup 302 by a mass of high temperature cement or insulating material 311. An inner tube 312 having a diameter less and a length greater than the tube 310 has a lower extremity firmly secured by the cement in the tube 310 and cup 302 and against the bottom wall of the latter in general alignment with the aperture 306. In practice these tubes 310 and 312 are constructed from cardboard, but it is to be understood that any fragible material suitable for this purpose may be utilized. It will be observed that inner portions of the tube 310 and the mass 311 project inwardly beyond the confines of the cup 302 whereby to lend support for the tube 312 and associated components which will now be described.

The device 300 further includes a receiving means or mold structure, generally designated 313, preferably of powdered metal, and an inner tube 314 preferably constructed from Pyrex glass. It is to be understood that any materials which will withstand high temperatures may be utilized.

The receiving means or mold structure 313 may be designed and constructed in various ways but as exemplified in FIGS. 2, 3 and 4, it is preferably comprised of a pair of half or complementary sections 315 and 316. The tube 312, above referred to, constitutes means for maintaining or holding the sections assembled. Each of the sections preferably includes a relatively large annular portion having a bottom wall 317 and side wall structure 318 which define a pocket or recess 319. Each section also preferably includes an integral radial or tapered lateral continuation 320 provided with a semicylindrical groove 321 extending throughout the length of the continuation. Attention is directed to the fact that continuations have opposed longitudinally extending planar edges 322 and that the inner ends of the groove are provided with abutments 323.

The end surface of each of the wall structures of the sections is planar as indicated at 324 and interrupted by a pair of diametrically disposed projections 325 and a pair of diametrically disposed notches or recesses 326 that latter of which are circumferentially spaced 90° apart from the projections. The receiving means or mold structure 313 is preferably so designed and constructed that when the sections are correctly held in assembled relation by the tube 312 which is telescoped into a snug surrounding relationship with the tapered continuations 320, the opposed planar surfaces 322 of the continuations will be held in intimate bearing relationship and the projections 325 will be disposed in interfitting or interlocking relationship with the notches 326 whereby to maintain the marginal end surfaces 324 of the wall structures of the sections in a predetermined spaced parallel relationship so that preferably a plurality of three circumferentially spaced arcuate vents or openings 327 are provided through which a fluid such as gas or air may escape when the molten metal is received in the mold structure.

Experimentation and testing has proven that the optimum gap, spacing, or size of the vents or openings should be within a predetermined range for sampling basic oxygen processed steels due to their higher temperatures. More particularly, in this respect, it was initially believed that no vent openings were essential on the basis that the heat of the molten metal would cause the mold sections to separate and release the trapped gases. However, failures did occur in practice so tests were conducted which proved that the size of the vent or vents was critical in certain structures. It was discovered that a relatively small vent or a narrow gap between the large portions of the sections caused back pressure and restrained the molten metal from entering and completely filling the receiving means or mold cavity. It was further discovered that a vent of relatively large size or an excessive gap between the large portions of the sections caused the molten metal to bleed through the vent and seal the sections together thereby resulting in obtaining a porous test sample of poor quality.

Attention is directed to the fact that the projections and notches constitute means which assist in assembling, locating, aligning, or placing the sections in registry; that the pockets 319, in combination, define a chamber 328 which finally receives the molten metal; that the longitudinal grooves 321 in the continuations, in combination, define a tubular formation or socket which snugly receives one extremity of the glass tube 314 which engages the abutments 323 for limiting inward movement of the tube; and that the lower extremity of the glass tube extends beyond the continuations and through the aperture 306 in the cup 302, and is secured in place by the surrounding cement 311 in the tube 312. It will be apparent that the tube 312 is also firmly anchored in place by the cement 311; that the cement within the confines of the tube 312 assists in sealing and securing the glass tube in the socket, the inner ends of the continuations together and the glass tube in the aperture 306 so that the molten metal will flow through the glass tube prior to reception in the chamber 328 of the receiving means 313. It will be observed that the longitudinal axes of the receiving means 313, glass tube 314 and the tube 312 are coincidental and inclined with respect to the longitudinal axis of the outer jacket 301. It is to be understood that the device may be made in which the aforementioned axes may be in alignment with the longitudinal axis of the jacket or parallel thereto.

After a sample more or less in a lollypop form has been cast, certain of the various components such as the housing 301, tubes 310, 312 and 314, sections 315 and 316, glass tube 314 and cups may be readily separated, destroyed, disintegrated, or broken apart so as to obtain the sample.

In view of the foregoing, it should be manifest that the structure illustrated in FIGS. 2, 3 and 4, among other thing comprises an outer jacket or housing 301; an inner tube 314 which is supported by a mass of material 311 which is highly resistant to heat deterioration; that the means 313 is disposed within the confines of the housing and is provided with a chamber 328 which communicatively connects with the upper end of the tube 314; that means which may comprise one or more of the cups 302, 303, 304 provide at least a second chamber which communicatively connects with the lower end of the tube 314 for initially receiving a liquid for transmission into said tube and the chamber 328; and that means, such as the fusible element 309, serves to condition the fluid in the second chamber to its reception into the tube 314.

Referring now to the device embodying the subject invention and exemplified in FIG. 5 of the drawing there is disclosed a housing 475, preferably of metal, and a unit or subassembly substantially disposed therein. This unit preferably includes a receiving means 476 substantially corresponding to the receiving means 313, above referred to, and a tube 477, preferably of glass, having an upper extremity held in a lower generally tubular extension of the receiving means. The receiving means 476 is comprised of half-sections and an annular ring or abutment 478, preferably constructed of cardboard, surrounds the extensions of the receiving means and serves to hold, stabilize, and reinforce the sections. A tubular member 479, preferably of cardboard, is disposed in an upper or first cup 480 and a mass of cement or insulating material 481 is interposed between the cup and the member and with a mass 482 in the member and surrounding at least a portion of the extension of the receiving means for maintaining these parts in a firm fixed relationship, and so that the receiving means is centered or substantially axially arranged in the housing. A thin tubular element 482', preferably of cardboard, surrounds a lower extremity of the tube and abuts the bottom wall of the cup and the lower end of the extension and assists in positioning the receiving means at a predetermined elevation from the entrance end of the tube 477, centering the tube in relation to an aperture 483 provided in a bottom wall of the cup 480, and preventing cement from entering the aperture. A second cup 484 may be press-fitted onto the cup 480 and is provided with an aperture 486 and a third cup 485 has an aperture 487 therein which is normally closed by a deoxidizing element 488. The unit may be held in the housing by flanging the latter inwardly at 489 against the third cup 485. If found desirable, a ceramic or insulating material 490 may be applied to the housing and to at least a portion of the third cup for protective purposes, or a metal sleeve may be placed about the housing to minimize turbulence during the sampling operation, thereby protecting the safety of the operator.

Figure 6:
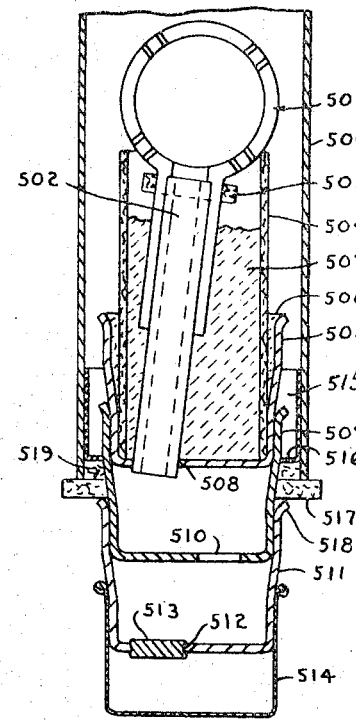
FIG. 6 is a vertical section showing a modified device.

The device illustrated in FIG. 6 preferably comprises a metal housing 500, a receiving means generally designated 501, a tube 502 preferably of glass, and an abutment 503 like the one shown in FIG. 5. A tubular member 504, preferably of cardboard, has a lower end disposed in an upper or first cup 505 and an upper end which surrounds a lower tubular extension of the receiving means and may engage a head thereof. A mass of cement or insulating material 506 is interposed between the member 504 and cup and a larger mass 507 is disposed in the cup and surrounds the extension of the receiving means and the tube 502 whereby to firmly secure these parts together to constitute a unit or subassembly, with the receiving means and the tube arranged in an inclined position and a lower end of the tube disposed in an aperture 508 provided in a bottom wall of the cup. A second cup 509 is press-fitted about the upper cup and provided with an aperture 510. A third cup 511 is press-fitted onto the second cup and provided with an aperture 512 having a deoxidizing element 513 normally closing the same. A lower cup or cap 514 is press-fitted onto the third cup. If desired, the cups 509, 511 and 514 may also constitute components of the unit or subassembly.

The unit is preferably affixed to the housing 500, preferably of steel, by utilizing an inner fitting 515 which is secured in the housing and provided with an inturned flange 514 having an opening therein which snugly receives the cup 509 whereby to assist in centering and stabilizing the unit. A planar washer or ring 517, preferably made of fiber or insulating material, is also utilized to connect and stabilize the unit by snugly engaging the cup 509 at a location spaced longitudinally from its engagement with the fitting 516. This washer also engages a lower extended marginal end edge of the housing and a rim or lip 518 of the cup 511 to additionally stabilize the components. Another washer or ring 519 is preferably interposed between the cup 509 and an extended edge of the housing and between the flange 516 and the washer 517. These washers serve to deter or prevent solidification of metal at the entrance end of the tube 502 and constitute a joint or parting area for forcing the solidified sample from the lower end of the housing, preferably by driving a shaft inwardly through an open end of the housing. However, the sample may also be removed by forcing the same in an opposite direction through the end of the housing.

Figure 7:
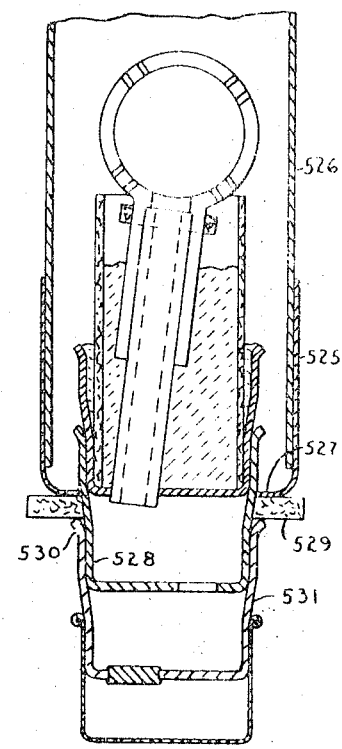
FIG. 7 is a vertical section depicting another modified device.

The device shown in FIG. 7 is substantially the same as the one depicted in FIG. 25 but differs therefrom to the extent that a fitting or ferrule 525, preferably of metal, is secured to and surrounds a lower extremity of a metal housing 526. This ferrule is provided with a bottom wall 527 having a relatively large opening therein which snugly receives a cup 528, and a ring or washer 529, preferably of fiber or insulating material, snugly surrounds the cup 528 and is interposed between the bottom wall 527 and a rim or edge 530 of an apertured third cup 531. As shown, the assembly may also include a third cup carrying a deoxidizing element and a fourth cup protecting the third cup. With this unique organization and those shown in FIGS. 5 and 6, the receiving means and/or assembly or unit is supported generally axially with an annular space thereabout. The embodiment shown in FIGS. 5, 6 and 7 provide means whereby the unit of each is connected by fragile or frangible connecting means at a localized or restricted area of minimum axial extent at a location intermediate its length to a lower end or edge of each of the housings, thereby affording a unique setup which facilitates release of each unit after a sample or specimen has been obtained.

Referring now to the procedure in obtaining or recovering a specimen, the preferred method comprises plunging or dipping the device into the molten bath 23 in a vessel 24, through a layer of slag or impurities 25 so that the lower end of the device is below the layer as evidenced in FIG. 1. A relatively long wand 26 is preferably press-fitted into the upper open end of the housing 1 to facilitate manipulation of the device. The device is preferably held in the bath for a very brief period of time. After a few seconds or a sufficient time interval has elapsed in order to permit filling of the receiving means, the device is quickly lifted from the bath of molten metal and then may be subjected to a cooling medium, such as cold water, a blast of cool air or it may be placed on a work bench and allowed to cool. In any event, the specimen retrieved from the molten bath is not utilized until after it has solidified and cooled to such an extent that it can be operated on for analysis. The specimen or sample solidifies or begins to solidify while the device is immersed in the molten metal. It is desirable that the analysis of the specimen be obtained expeditiously so that it may be quickly analyzed in order to determine or ascertain whether the molten metal is in accord with preselected or predetermined specification or requirements. If, for example, the specimen indicates that the molten metal is not of the character desired, then the metal contained in the vessel 24 may be modified or changed. In some instances, it may be necessary to obtain more than one sample or specimen of the molten metal before the latter is brought up to a required standard.

Having thus described my invention, it is obvious that various modifications may be made in the same without departing from the spirit of the invention, and, therefore, I do not wish to be understood as limiting myself to the exact forms, construction, arrangements, and combinations of parts herein shown and described.

I claim:
1. A device of the kind described comprising a housing having an end wall provided with an opening, a unit disposed in said opening for receiving a hot liquid, and means supporting said unit in said opening and said housing with space in said housing surrounding said unit, said supporting means being readily destructible whereby to facilitate separation of said unit from said housing.

2. The device defined in claim 1, in which said supporting means comprises one or more washers which surround said unit and engage a lower end area of the housing.

3. The device defined in claim 2, in which said end wall is part of a cap which receives a lower end of said housing.

4. The device defined in claim 2, in which said receiving means is supported in a cup, and a washer surrounds said cup and engages a lower end of said housing.

5. The device defined in claim 2, in which said supporting means includes a cup carrying said receiving means, a fitting disposed in said housing and surrounding said cup, and a washer surrounding said cup which engages an end area of said housing.

6. The device defined in claim 2, in which said unit comprises wall structure forming a chamber and tubular means communicating with said chamber through which the liquid flows into the chamber.

7. The device defined in cliam 2, in which said unit includes a cup, wall structure defining a chamber which receives the liquid, tubular means communicating with said chamber through which the liquid flows into the chamber, a tubular member for positioning the wall structure, and a mass of cement surrounding said wall structure, tubular means and tubular member for anchoring the same in said cup.

8. The device defined in claim 2, in which a sheath of ceramic material surrounds said housing.

9. A device of the kind described comprising an elongated housing having a lower end provided with an opening, a unit disposed in said opening for receiving a sample of molten metal, means engaging said end and supporting said unit in said opening and said housing with space in said housing surrounding said unit, said supporting means being readily destructible whereby to facilitate separation of said unit from said housing.

10. The device defined in claim 9, in which said supporting means comprises a pair of washers, with one washer being disposed in said housing and the other being located externally of said housing.

References Cited

UNITED STATES PATENTS 3,415,125  12/1968  Collins _____ 73—425.4
3,452,602  7/1969   Hackett _____ 73—425.4

S. CLEMENT SWISHER, Primary Examiner